United States Patent [19]
Allsopp

[11] Patent Number: 5,651,304
[45] Date of Patent: Jul. 29, 1997

[54] PISTON AND CONNECTING ROD ASSEMBLY

[75] Inventor: Neville Thomas Allsopp, 1 Estate Drive, Salamander Bay, New South Wales, Australia

[73] Assignees: Neville Thomas Allsopp; Judith Olive Allsopp, both of New South Wales, Australia

[21] Appl. No.: 530,213

[22] PCT Filed: May 4, 1994

[86] PCT No.: PCT/AU94/00226

§ 371 Date: Nov. 14, 1995

§ 102(e) Date: Nov. 14, 1995

[87] PCT Pub. No.: WO94/25745

PCT Pub. Date: Nov. 10, 1994

[30] Foreign Application Priority Data

May 4, 1993 [AU] Australia .................. PL8615

[51] Int. Cl.$^6$ ...................................... F16J 1/14
[52] U.S. Cl. ........................... 92/187; 123/197.3
[58] Field of Search ........... 92/129, 187; 123/197.3, 123/197.4, 48 B

[56] References Cited

U.S. PATENT DOCUMENTS

| | | | |
|---|---|---|---|
| 1,430,491 | 9/1922 | Calcaterra et al. | 123/197.4 X |
| 1,431,617 | 10/1922 | Young | 123/197.2 |
| 1,607,130 | 11/1926 | Knight | 92/187 X |
| 2,260,240 | 10/1941 | Taylor . | |
| 2,356,033 | 8/1944 | Criddle | 123/78 E |
| 2,574,934 | 11/1951 | Perry | 309/17 |
| 3,908,623 | 9/1975 | McWhorter | 123/197.4 X |
| 4,463,710 | 8/1984 | McWhorter | 123/48 B |
| 4,515,114 | 5/1985 | Dang | 123/48 B |
| 5,156,121 | 10/1992 | Routery | 92/187 X |
| 5,239,958 | 8/1993 | Booher | 123/197.3 X |
| 5,245,962 | 9/1993 | Routery | 92/187 X |

FOREIGN PATENT DOCUMENTS

| | | |
|---|---|---|
| 1170326 | 11/1969 | United Kingdom . |
| 91/19087 | 12/1991 | WIPO . |
| 93/11348 | 6/1993 | WIPO . |

*Primary Examiner*—Hoang Nguyen
*Attorney, Agent, or Firm*—Ladas & Parry

[57] ABSTRACT

A piston and connecting rod assembly (140) including a connecting rod (141) and a piston (142). The piston (142) is caused to move linearly relative to the connecting rod (141) in response to relative pivoting therebetween by engagement of a bearing element (150) and an inclined surface (152). The piston (142) is attached to the connecting rod (141) by further bearing elements (144) rotatably mounted in flanges (158) of the piston (142.)

6 Claims, 2 Drawing Sheets

PISTON AND CONNECTING ROD ASSEMBLY

FIELD OF THE INVENTION

The present invention pertains to internal combustion engines and more particularly to a piston assembly incorporating a novel interconnection between piston and connecting rod.

BACKGROUND OF THE INVENTION

Ignition in an internal combustion engine, takes place just prior to the piston reaching "top dead centre". Combustion takes place with considerable expansion of the mixture within the combustion chamber.

It is advantageous for combustion to take place at as high a pressure as possible. Engines are usually designed to have a compression ratio of 8:1 to 9:1. However as the piston is descending combustion is still taking place and accordingly, pressure within the combustion chamber is reduced from an optimum. This results in incomplete combustion of the fuel which in turn leads to loss of power and pollution problems.

Disclosed in International Application PCT/CA92/00522 is a piston rod and piston connection which addresses the above issue. The upper end of the piston rod is provided with raised portions which engage the underside of the piston crown. As the connecting rod rotates angularly, the piston is caused to move away from the other end of the connecting rod.

Similar such mechanisms are disclosed in U.S. Pat. Nos. 1,431,617, 4,515,441, 2,260,240 and 2,574,934.

OBJECT OF THE INVENTION

It is an object of the present invention to substantially ameliorate some of the disadvantages with prior an piston assemblies or to provide a meaningful alternative to conventional piston and connecting rod design.

SUMMARY OF THE INVENTION

There is disclosed herein a piston and connecting rod assembly for an internal combustion engine, said assembly comprising:

a piston having a piston crown;

a connecting rod having a piston end and a crank end; and abutting surfaces causing longitudinal movement of said crown portion away from said piston end during relative pivoting of said piston through a predetermined angle relative to said piston end.

BRIEF DESCRIPTION OF THE DRAWINGS

A preferred form of the present invention will now be described by way of example with reference to the accompanying drawings wherein.

BEST MODE AND OTHER EMBODIMENTS OF THE PRESENT INVENTION

Figure 2:
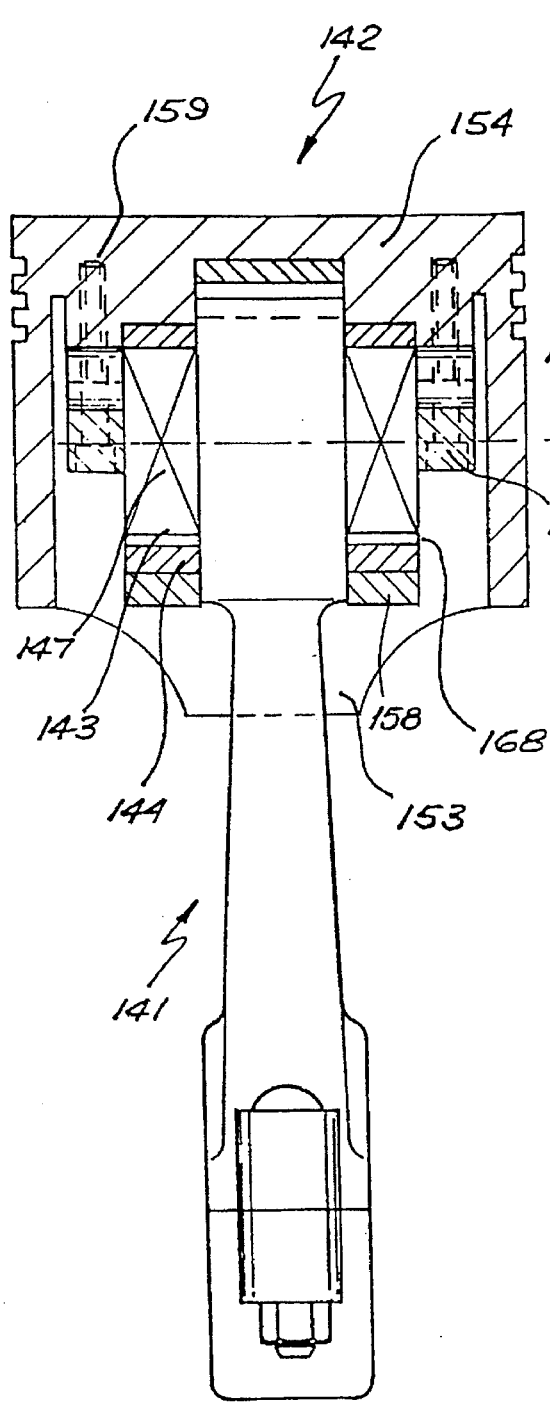
FIG. 2 is a schematic end elevation of the connecting rod and piston of FIG. 1.
Figure 1:
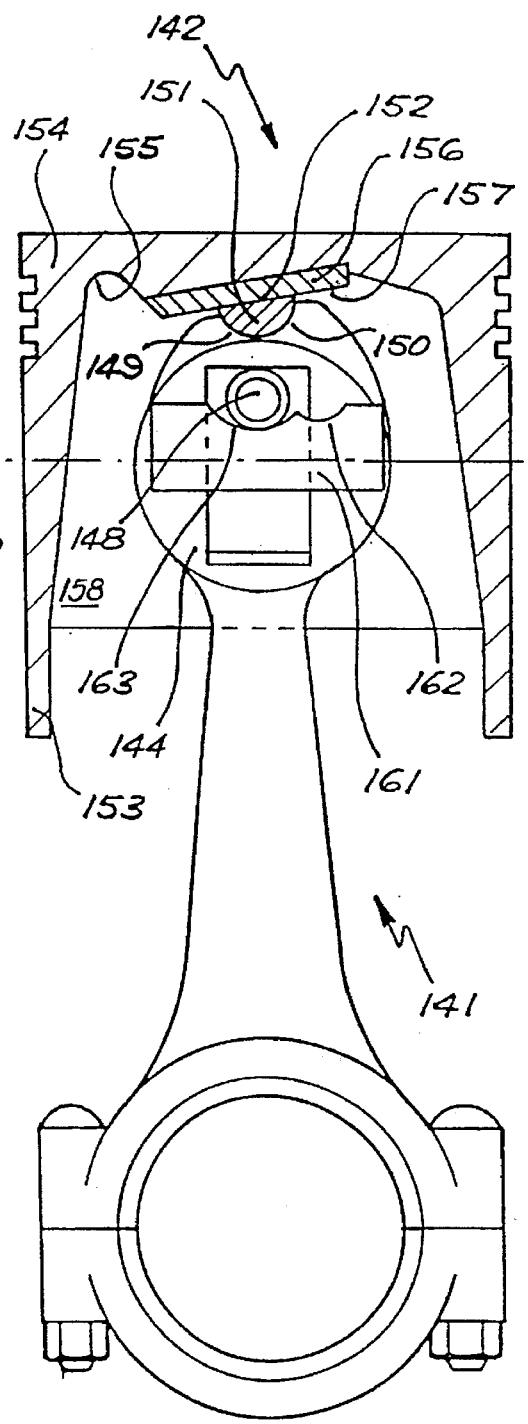
FIG. 1 is a schematic side elevation of a connecting rod and piston.
Figure 3:
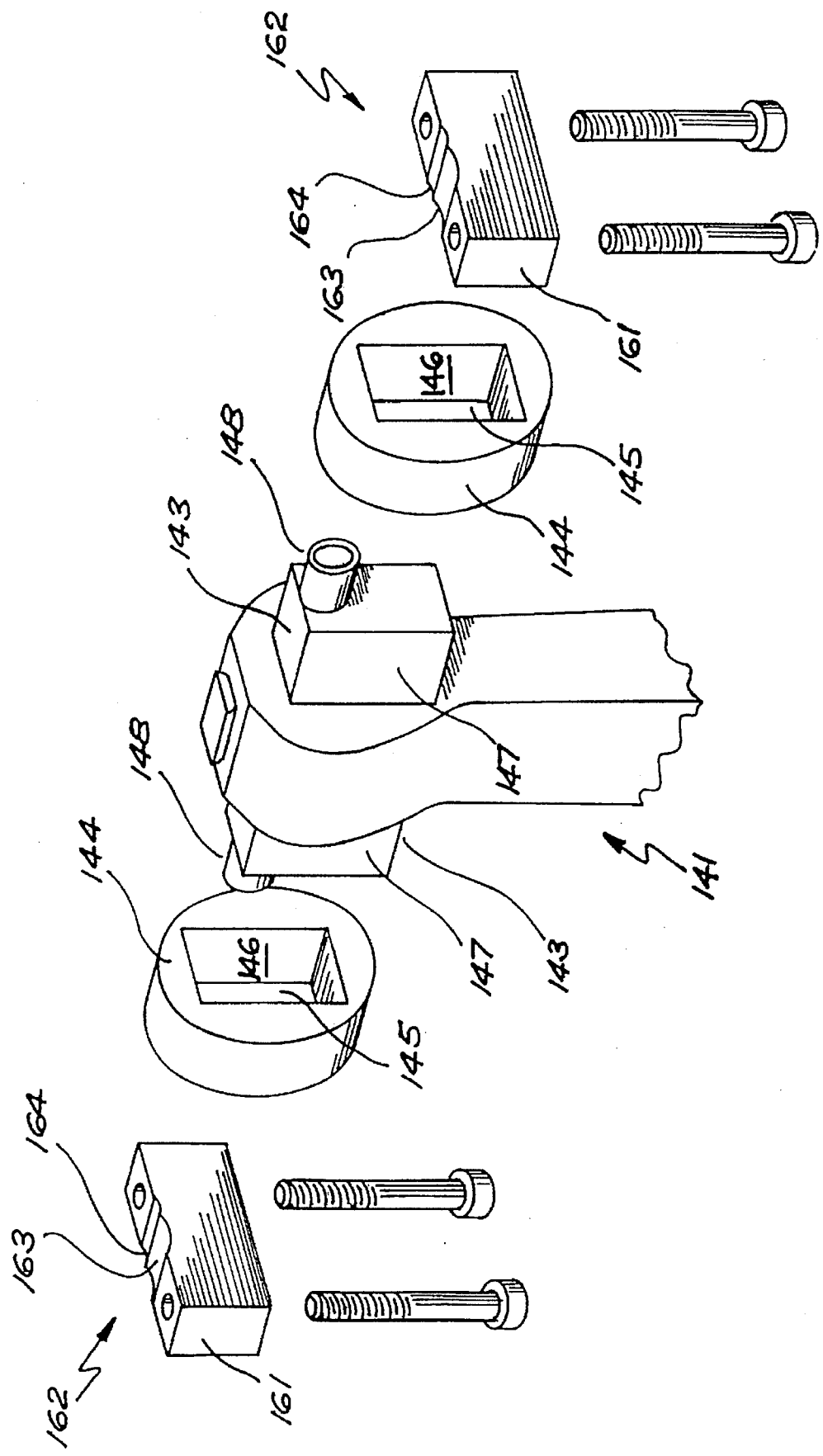
FIG. 3 is a schematic parts exploded perspective view of the connecting rod of FIGS. 1 and 2.

In FIGS. 1, 2 and 3 there is schematically depicted a piston and connecting rod assembly 140. The assembly 140 includes a connecting rod 141 which connects the piston 142 to the crank shaft of an internal combustion reciprocating engine. The connecting rod 141 includes a pair of guide blocks 143 which are received within circular bearing elements 144. More particularly, each of the bearing elements 144 is provided with an aperture in the form of an elongated rectangular slot 145. Each slot 145 has longitudinal sides 146 which slidably engage the elongated sides 147 of the blocks 143. However, the guides 143 have a total length (extending in the longitudinal direction of extension of the connecting rod 141) which is shorter than the length of the sides 146. Accordingly, the blocks 143 can move longitudinally along the slots 145 while being engaged by the sides 146. Extending transversely outwardly from the blocks 147, along a common axis, are pins 148.

The extremity of the connecting rod 141 is provided with a recess 149 having a surface 150 that conforms to the surface of a cylinder. Located in the recess 149 is a bearing element 151 having an external surface matching the surface 150. The bearing element 151 is freely rotatable in the recess 149. The bearing element 151 has a planar bearing surface 152.

The piston 142 has a pair of piston skirt portions 153 and a piston crown 154. The crown 154 has an internal surface 155 provided with an inclined bearing element 156 having a generally planar surface 157. The element 156 is fixed with respect to the crown 154. The surface 152 of the bearing element 150 slidably engages the surface 157.

The crown 154 is provided with a pair of threaded passages 159 which are engaged by a pair of threaded fasteners 160. The fasteners 160 attach to the crown 154 a pair of cam members 161. The cam members 161 each have a cam profile 162 including two cam segments 163 and 164 which engage the pins 148. The pins 148 in cooperation with the cam members 161 retain the piston 142 in its correct position to ensure that the piston 142 does not impact against an associated cylinder head, while still permitting movement of the piston 142 away from the crank shaft after the piston 142 passes "top dead center".

In the above described preferred embodiment, there is substantial area contact between the surfaces 152 and 157 to minimize wear. The surfaces 152 and 157 would be lubricated by oil circulating within the engine.

As the connecting rod 141 is angularly displaced relative to the piston 142, the bearing elements 144 rotate in supporting internal flanges 158 of piston 142 to accommodate the angular disposition of the piston 142 relative to the connecting rod 141. The bearing element 150 would also slide along the surface 157.

In the embodiments of FIGS. 1, 2, and 3, the guide blocks 143, with respect to the apertures 145 would be provided with a clearance 168 to permit the above discussed movement of the guide blocks 143 with respect to the bearing elements 144. The bearing elements 144 permit angular movement of the piston 142 about the axis 169 by rotation in the flanges 158.

The above described preferred embodiment will have the advantages of increasing power output as a great proportion of the burnt fuel, and the combustion gases are permitted to expand when the crankshaft is better angularly positioned to be driven by the connecting rod 141. The piston 142, during initial pivoting of the connecting rod 141 relative thereto, is caused to move so that the volume of the combustion chamber remains constant despite angular movement of the connecting rod 141. This has two effects, which are firstly, combustion takes place at a higher pressure (due to the volume of the combustion chamber remaining constant or substantially constant) and secondly, the combustion gases are not permitted to expand until the crankshaft is in a better position to receive power from the connecting rod 141. That is, there is a delayed movement of the piston 142 in response to the pressures generated in the combustion chamber.

I claim:

1. A piston and connecting rod assembly for an internal combustion engine, said assembly comprising:

a piston having a crown;

a connecting rod having a crank engaging end and a piston engaging end with a longitudinal axis extending therebetween, a pair of laterally extending guide projections at said piston end located on opposite sides of said axis, said guide projections having a pair of parallel sides extending generally parallel to said axis, a pin extending laterally from each guide projection in a direction generally normal to said axis, said pins having a common longitudinal axis;

a bearing element associated with each guide projection, the bearing elements being mounted in the piston for rotation about an axis transverse of the longitudinal axis of the rod, each bearing element having an aperture defined by surrounding surfaces slidably engaging the parallel sides of the associated guide projection;

cooperating sliding abutment surfaces on said piston and said piston engaging end of said connecting rod to cause linear relative movement between said piston crown and said connecting rod in response to relative pivoting movement between said connecting rod and said piston; and a retaining member associated with each pin and attached to the piston to limit said relative linear movement between said piston crown and said connecting rod.

2. The piston and connecting rod assembly of claim 1, wherein said cooperating sliding abutment surfaces include an inclined surface attached to said crown and a surface on a further bearing element mounted in said connecting end of the piston.

3. The piston and connecting rod assembly of claim 2, wherein said further bearing element is pivotally mounted in said engaging end of the piston for pivoting about an axis transverse of the longitudinal axis of the connecting rod.

4. The piston and connecting rod assembly of claim 3, wherein each said retaining member includes first and second segments which engage the associated pin, said first segment corresponding to a position in which the piston is located adjacent to a "top dead center" position, said second segment being associated with the piston as the piston moves from the "top dead center" position.

5. The connecting rod and piston assembly of claim 1, wherein said abutment surfaces cooperate to retain the piston at a position, relative to said connecting rod, in which the piston is maintained at a position adjacent to a "top dead center" position thereof.

6. The connection rod and piston assembly of claim 1, wherein said aperture in each bearing element is in the form of a rectangular slot.

* * * * *